(12) United States Patent
Winters

(10) Patent No.: US 11,479,247 B1
(45) Date of Patent: Oct. 25, 2022

(54) SYSTEM AND METHOD FOR ADJUSTABLE MOTORCYCLE THROTTLE LOCK CRUISE CONTROL

(71) Applicant: David James Winters, Edmonds, WA (US)

(72) Inventor: David James Winters, Edmonds, WA (US)

( * ) Notice: Subject to any disclaimer, the term of this patent is extended or adjusted under 35 U.S.C. 154(b) by 0 days.

(21) Appl. No.: 17/512,516

(22) Filed: Oct. 27, 2021

(51) Int. Cl.
| | |
|---|---|
| *B60W 30/14* | (2006.01) |
| *B60K 31/00* | (2006.01) |
| *B60K 28/14* | (2006.01) |
| *B62K 23/04* | (2006.01) |
| *B62J 45/414* | (2020.01) |
| *B62J 45/20* | (2020.01) |

(52) U.S. Cl.
CPC ........... *B60W 30/143* (2013.01); *B60K 28/14* (2013.01); *B60K 31/00* (2013.01); *B62J 45/20* (2020.02); *B62J 45/414* (2020.02); *B62K 23/04* (2013.01); *B60W 2520/105* (2013.01); *B60W 2540/10* (2013.01); *B60W 2540/12* (2013.01); *B60W 2540/14* (2013.01); *B60W 2552/15* (2020.02); *B60W 2556/60* (2020.02); *B60W 2710/0605* (2013.01); *B60W 2710/18* (2013.01); *B60W 2720/10* (2013.01)

(58) Field of Classification Search
None
See application file for complete search history.

(56) References Cited

U.S. PATENT DOCUMENTS

| | | | | |
|---|---|---|---|---|
| 7,826,959 | B2 * | 11/2010 | Namari | F02D 11/105 701/110 |
| 8,534,397 | B2 * | 9/2013 | Grajkowski | B60K 31/00 180/170 |
| 9,254,749 | B2 * | 2/2016 | Wang | B60K 31/00 |
| 10,493,982 | B2 * | 12/2019 | Shiraishi | B60W 30/143 |
| 2010/0204874 | A1 * | 8/2010 | Oyer | B60K 31/047 701/31.4 |
| 2020/0400840 | A1 * | 12/2020 | Knitt | B60W 30/143 |

* cited by examiner

*Primary Examiner* — Todd Melton
(74) *Attorney, Agent, or Firm* — Christopher Mayle; Bold IP, PLLC

(57) ABSTRACT

A system and method for an electronic cruise control used to supplement electronic control units or vehicles for enhanced or additional cruise control integration. The electronic cruise control is designed to be updated easily by the end user or system to adjust the speed of a vehicle such as a motorcycle whereby the electronic cruise system sends a control signal to rotate an existing throttle to maintain the motorcycle's speed whereby the throttle grip position will always reference the speed of the motorcycle.

16 Claims, 2 Drawing Sheets

SYSTEM AND METHOD FOR ADJUSTABLE MOTORCYCLE THROTTLE LOCK CRUISE CONTROL

FIELD OF DISCLOSURE

The overall field of this invention is a system and method for electronic cruise system modifications for a vehicle and more particularly for an electronic control unit modification integrated initially or used to supplement a preexisting cruise control or vehicle with additional vehicle control while the electronic cruise system is activated.

BACKGROUND

In modern day vehicles, such as motorcycles, which use handlebars for steering, the speed of the vehicle is controlled by a mounted rotatable accelerator sleeve unit that is fastened to the right end of the handlebar which is usually wrapped with a rubber, metal, or plastic grip. This rotatable accelerator sleeve, which is commonly called a throttle, is directly coupled to the vehicle's throttle housing or switch housing or simply a bracket mounted to the handlebar, which transfers the rotation of the sleeve into either one or more throttle cables or an electronic sensor. Thus, by rotating the accelerator sleeve, the engine in the vehicle will either accelerate, maintain or decelerate the speed of the vehicle, depending on the direction of the rotation.

During normal riding circumstances, for convenience and safety purposes, the throttle is typically designed using a biased return spring to rotate the throttle back to its resting position, which may maintain the vehicle's engine idle and prevent the vehicle from accelerating. Accordingly, various vehicles have been proposed with cruise control functionalities for maintaining a constant speed using electronic cruise. However, current electronic cruise control set speeds cannot be reset up and down by the operator's input through the rotatable accelerator sleeve but is typically reset through other ancillary means. Thus exists the need for a device that lets the control system and operator to adjust the set speed of the motorcycle at all times when cruise control is active, thus allowing the operator the ability to tactilely know the required throttle position in reference to any given speed while using their electronic cruise control, just like they do when riding without the electronic cruise control activated.

SUMMARY

The embodiments of the present invention are directed to an electronic cruise system connected to a throttle on a vehicle that is rotatable to provide the vehicle with additional vehicle control while the electronic cruise system is activated, the electronic cruise system having one or more computing systems to perform steps of rotating the throttle to accelerate, decelerate, or maintain speed of the vehicle, whereby the one or more computing systems further perform the steps of: holding the throttle in place with a throttle lock mechanism when an operator provides no rotation to the throttle, receiving input from the operator rotating the throttle from a first position to a second position, determining if the throttle is held at the second position for a predetermined amount of time, calibrating the speed of the vehicle in response to the determination, holding the speed referenced by the throttle in place at the second position with the throttle lock mechanism, disengaging the electronic cruise system in response to one or more sensors determining the vehicle has been in an accident or has tipped over to a side, whereby the throttle is configured to spring back without any interference from the electronic cruise system, disengaging the electronic cruise system in response to a front brake, a rear brake, or clutch being engaged, whereby the throttle is configured to spring back without any interference from the electronic cruise system, adjusting a position of the throttle with the throttle lock mechanism in response to environmental conditions, the electronic cruise system further including one or more sensors, whereby the one or more sensors include one or more accelerometers, whereby the one or more sensors include one or more impact sensors, whereby the one or more sensors determine RPM of one or more wheels of the vehicle, the electronic cruise system further including one or more LED lights configured to show one or more statuses of the electronic cruise system, a GPS tracking unit to determine the speed of the vehicle, analyzing one or more generated virtual maps with geography and topography of a real world location that is determined to be a location of the vehicle from the GPS tracking unit, one or more actuators to resume or maintain the speed, accelerate, or decelerate, to turn on or off throttle lock mode, to turn on or off GPS signaling, or to turn on or off the throttle from referencing the speed of the vehicle.

The embodiments of the present invention are directed to an electronic cruise system connected to a rotating throttle on a vehicle to provide the vehicle with additional vehicle control while the electronic cruise system is activated, the electronic cruise system having a throttle lock mechanism which holds the throttle in place when an operator provides no rotation to the throttle, whereby the electronic cruise system calibrates a speed of the vehicle in response to a received gesture by the operator upon the throttle for a predetermined amount of seconds, further including one or more sensors including one or more accelerometers and one or more impact sensors, a GPS tracking unit to determine the speed of the vehicle whereby the electronic cruise system analyzes one or more generated virtual maps with geography and topography of a real world location, whereby the electronic cruise system disengages the electronic cruise system in response to the one or more sensors determining the vehicle has been in an accident or has tipped over to a side, whereby the throttle is configured to spring back without any interference from the electronic cruise system, whereby the electronic cruise system disengages the electronic cruise system in response to a front brake, a rear brake, or a clutch being engaged, whereby the throttle is configured to spring back without any interference from the electronic cruise system.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
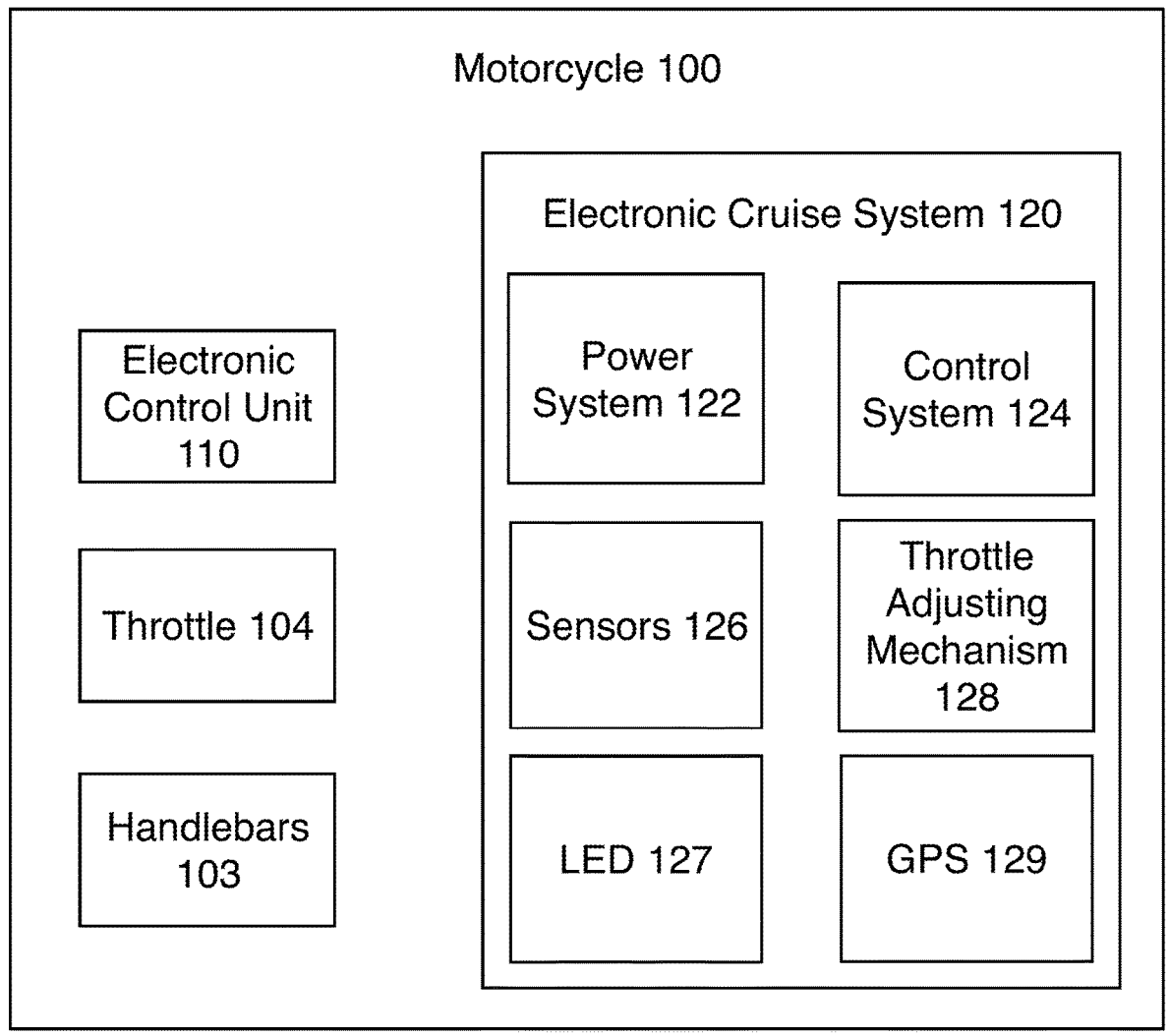
FIG. 1 depicts a block diagram of a motorcycle in accordance with the present invention.

In the Summary above and in this Detailed Description, and the claims below, and in the accompanying drawings, reference is made to particular features of the invention. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure recognizes the unsolved need for an improved system and method for an electronic cruise system used to supplement preexisting electronic control units or integrated initially or without a preexisting system or replacing an electronic control unit for enhanced cruise control integration. The electronic cruise system has the ability to also function as a separate standalone in addition to a parallel module in conjunction with the current electronic control unit of the motorcycle. The electronic cruise system is designed to be updated easily by the end user in order to add functionality as it is developed, thus prolonging the viability of an electronic control unit or vehicle.

The electronic cruise system may be designed that it sends a control signal to rotate an existing throttle to maintain the motorcycle's speed whereby the throttle grip position will always reference the speed of the motorcycle. With the electronic cruise system, both the user and the device can adjust the set speed of the motorcycle at all times while it is held. This allows the operator the ability to tactilely know the required throttle position for their current speed by simply holding the throttle, rather than hunting for the speed experienced with other cruise controls that operate with the throttle in its rest position. When motorcycles are in motion, it is safer and more convenient for the operator if the throttle position always references the speed of the motorcycle as motorcycles do when not using electronic cruise control.

As illustrated in FIG. 1, electronic cruise system 120 may be used in conjunction with motorcycle 100 or other vehicle to supplement the existing electronic control unit 110 whereby electronic cruise system 120 may provide additional input and output between the existing electronic control unit 110 and electronic cruise system 120 for cruise control capabilities. In one or more non-limiting embodiments, electronic cruise system 120 may have the ability to integrate adjustable cruise control technology in existing motorcycles 100 after manufacture or be initially integrated into electronic control unit 110 during manufacture.

Electronic cruise system 120 may provide all electrical and electronic communication between the various subsystems of the engine and other systems of the motorcycle. Electronic cruise system 120 may be responsible for overseeing, regulating, and altering the operation of the electronic systems in the vehicle, such as but not limited to ignition, emissions, cooling, or electronic fuel injection setup. Electronic cruise system 120 may have a plurality of inputs and outputs. Inputs may be connected to a wide array of sensors 126 on the engine which provide the electronic control unit with essential engine information.

Once the sensor information is received and processed, electronic cruise system 120 may create one or more commands based on the information received from one or more control signals or from the one or more sensors. Electronic cruise system 120 may then transmit commands and controls out via electronic outputs. Electronic cruise system 120 may be any different number and types of electronic control units commonly known by those of ordinary skill in the art. In one or more non-limiting embodiments, electronic cruise system 120 may be connected to or otherwise communicating with a remote communicator. The remote communicator receives data from electronic control unit 110 and transmits the data to a remote location for further analysis.

Electronic cruise system 120 may have a housing mechanically connected or mounted on motorcycle 100 whereby it is electronically and mechanically connected to a throttle 104 on handlebars 103. In the present embodiment, the housing may adopt a shell structure formed from a mold. Electronic cruise system 120 may have a rectangular prism shape, however, this is non-limiting and electronic cruise system 120 may be any suitable shape such as a square prism, sphere, or pyramid. Electronic cruise system 120 may be manufactured such that the one or more adapter-connectors are integrated to it.

Electronic cruise system 120 may include a power system 122 for providing energy to power a control system 124, sensors 126, and a throttle adjusting mechanism 128 during the process of transportation. Electronic cruise system 120 may be powered by methods known by those of ordinary skill in the art. In some embodiments, electronic cruise system 120 may plug into an electrical outlet using an electrical cord to supply power. Further, electronic cruise system 120 may include a rechargeable battery pack whereby the rechargeable battery is of a charge, design, and capacity to provide sufficient power to the various systems during operation for a set period of time needed. In other embodiments, power system 122 may be integrated into the existing fuel system of motorcycle 100.

Power system 122 may be connected to control system 124 which controls circuitry and one or more microprocessors or controllers capable of receiving input from sensors 126 and generating an output signal to a throttle adjustment mechanism 128 connected to a stationary point on throttle 104 mounted onto handlebars 103. The one or more microprocessors may have on-board memory to control the power that is applied to throttle adjustment mechanism 128 in response to input signals from the operator and from sensors 126. Control system 124 may be preprogrammed with any reference values by any combination of hardwiring, software, or firmware to implement various operational modes. Control system 124 may include circuitry to provide an actuable interface for the user to interact with, including switches and indicators and accompanying circuitry for an electronic control panel or mechanical control panel.

The one or more microprocessors in control system 124 may also monitor the current state of circuitry within control system 124 to determine the specific mode of operation chosen by the user. For instance, when motorcycle 100 is on, the one or more microprocessors may begin autonomously starting to identify various modes of throttle 104 and sensors 126.

Computing devices of control system 124, may be any type of computing device that typically operates under the control of one or more operating systems which control scheduling of tasks and access to system resources. Computing devices may be a Raspberry Pi® or other computing devices such as but not limited to a phone, tablet, television, desktop computer, laptop computer, networked router, networked switch, networked bridge, or any computing device capable of executing instructions with sufficient processor power and memory capacity to perform operations of control system 124.

Figure 2:
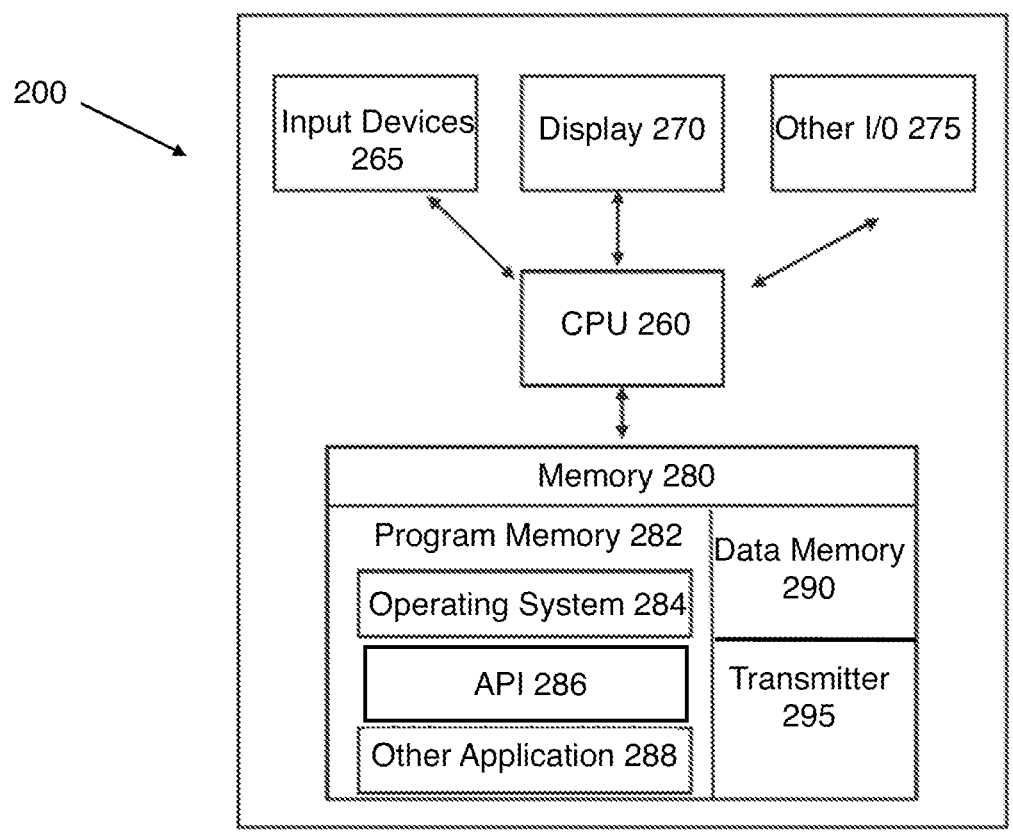
FIG. 2 depicts a block diagram of the computing devices of the cruise control system.

Turning to FIG. 2, FIG. 2 is a block diagram showing various components of computing device 200 which may be connected or integrated into control system 124. Computing device 200 may comprise a housing for containing one or more hardware components that allow access to edit and query control system 124. Computing device 200 may include one or more input devices such as input devices 265 that provide input to a CPU (processor) such as CPU 260 of actions related to a user. Input devices 265 may be implemented as a keyboard, a touchscreen, a mouse, via voice activation, a wearable input device, a camera, a trackball, a microphone, a fingerprint reader, an infrared port, a controller, a remote control, a switch housing, and combinations thereof.

Actions may be initiated by a hardware controller that interprets the signals received from input devices 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 270 may also comprise a touch screen interface operable to detect and receive touch input such as a tap or a swiping gesture. Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display 270 may be used as an output device, such as, but not limited to, a computer monitor, a speaker, a television, a smart phone, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programing interface (API), such as API 286, and other computerized programs or application programs such as application programs 288. Memory 280 may also include data memory such as data memory 290 that may include database query results, configuration data, settings, user options, user preferences, or other types of data, which may be provided to program memory 282 or any element of computing device 200.

Computing device 200 may have a transmitter 295, such as transmitter 295, to transmit vehicle performance data. Transmitter 295 may have a wired or wireless connection and may comprise a multi-band cellular transmitter to connect to a server over 2G/3G/4G cellular networks. Other embodiments may also utilize Near Field Communication (NFC), Bluetooth, or another method to communicate information.

Electronic cruise system 120 may have one or more LED lights 127 or apparatus connected to the one or more microprocessor to indicate various statuses. Electronic cruise system 120 may include a Mobile Location Determination System (MLDS) or Global Positioning System (GPS) 129 whereby they may include one or more satellite radios capable of determining the geographical location of motorcycle 100 in combination with one or more stored or generated maps stored by control system 124. Maps may be constructed as a geo-spatial environment of a geographical location in which motorcycle 100 is located. The virtual map may have geography and topography which parallels the geography and topography of the physical real world to determine elevation and distance.

Sensors 126 may include a plurality of detectors mounted to the housing of motorcycle 100 in the form of standard infrared ("IR") detectors having photodiode and related amplification and detection circuitry. In other embodiments, radio frequencies, magnetic fields, infrared, computer vision, potentiometers, ultrasonic sensors, and transducers may be employed. Detectors may be arranged in any number of configurations and arrangements. Control system 124 in combination with sensors 126 may use existing or generated maps and satellites for results and efficiency. In some embodiments, control system 124 may use any number of Lidar systems with improved scanning speed for high-resolution depth mapping in combination with one or more maps stored on databases of control system 124. Sensors 126 may include one or more sensors to calculate wheel rpm which may be calculated every 10 milliseconds from a running average of the time between pulses on the RPM input.

Sensors 126 may be in the form of wall detectors which may reflect IR light from the sides of motorcycle 100 to determine if motorcycle 100 is approaching a wall, a raised object, or incline surface or terrain. The wall detectors may send a signal through control system 124 to the one or more microprocessors containing an input value. The one or more microprocessors may then compare the received input value using a comparison function and evaluate the input data against a setting or expectation of a certain reference value for an "activation" position stored within the memory of control system 120.

Electronic cruise system 120 may further include sensors 126 in the form of cliff detectors, which may be able to reflect infrared ("IR") light off the floor near the edges of motorcycle 100 to determine if motorcycle 100 is approaching a drop off point or another barrier. During operation when motorcycle 100 approaches a drop off point, such as the top of a cliff without limitation, the cliff detectors may send a signal through control system 124 to the one or more microprocessors. The one or more microprocessors then compare the received input data using a comparison function and evaluate the input data against a setting or expectation of a certain range stored within the memory of control system 124.

Electronic cruise system 120 may have detectors in the form of impact sensors that are triggered when motorcycle 100 has a collision with another object to protect and retract components. For example, having detectors may be particularly useful during operation when motorcycle 100 is about to collide with an outside object. The impact detectors send a signal through control system 124 to the one or more microprocessors containing an input value. The microprocessors then compare the received input value using a comparison function and evaluate the input data against a setting or expectation of a certain reference value stored within the memory of control system 124.

Electronic cruise system 120 may have one or more "learning" algorithms stored one or more databases which creates weighted algorithms based on collected data. As the system matures, the complexity of the software and algorithms increase to provide results as required. The process for determining the needed extension or retraction of each segment may be fixed (e.g., preprogrammed in control system 124) or may be variable and is supported by a variety of available input devices 265, such as sensory and/or mechanical mechanisms such as sensors 126.

In operation, electronic cruise system 120 may be designed such that when the electronic control unit 110 is off; electronic cruise system 120 has no impact on the function of motorcycle 100 or throttle 104. Once motorcycle 100 is turned on, then electronic cruise system 120 may be turned on manually by one or more actuators such as a button or lever or automatically with motorcycle 100. Actuators may also control or resume speed, accelerate, or decelerate as well as turn on or off throttle lock mode, turn on or off GPS signaling, or turn on or off the throttle from referencing the speed of the bike.

If electronic cruise system 120 loses connection with its speed sensors 126, then electronic cruise system 120 may function like a throttle lock. When in throttle lock mode, electronic cruise system 120 will hold throttle 104 in any position the operator puts it in, providing just enough bias on the throttle return spring to prevent the accelerator sleeve from rotating back to its rest position.

While this is occurring, GPS 129 will attempt to acquire a signal; a flashing yellow light (or any type of notification) will signal the operator of this function on LEDs 127. Electronic cruise system 120 will work in throttle lock mode until the GPS signal (or any speed sensing device from sensors 126) has been acquired and capable of reading the motorcycle speed. LED 127 will turn green (or any type of notification) when the GPS signal is ready to provide speed for electronic cruise system 120. If the GPS signal is interrupted while in use, then electronic cruise system 120 will switch over to a wheel sensor mode whereby the RPM of the wheels are measured via sensors 126 to determine RPM instead of speed or to the throttle lock mode and display a flashing yellow light, or any other type of notification while electronic cruise system 120 attempts acquiring a GPS signal.

The operator may then adjust the speed of the motorcycle. The operator may simply rotate throttle 104 to accelerate, decelerate, or maintain their speed. Sensors 126 may then recognize that the operator is making these speed adjustments and send the signal to control system 124.

When the operator adjusts their speed by rotating the throttle 104, the new speed will dictate where the throttle position is held by throttle adjusting mechanism 128 whereby throttle 104 is held in place at the new position. While control system 124 is calibrating, electronic cruise system 120 may operate in throttle lock mode whereby the new speed would be saved after a stable 3-5 seconds hold at the desired new speed (this however is non-limiting and may be fully adjustable timing decided by the operator), then give over the speed adjustment function to GPS 129 once it has been calibrated. Electronic cruise system 120 may then send a signal to electronic control unit 110 or motorcycle 100 to adjust the held location of the rotating throttle 104 such that the throttle position is always referencing the motorcycle's speed. If the predetermined amount of time is not reached, the previous speed may be maintained after the operator has stopped adjusting the speed or the electronic cruise control might turn off or wait to recalibrate after the predetermined amount of time is reached at a steady speed. These settings are preset by the operator or adjusted while the operator is riding the motorcycle.

Electronic cruise system 120 may also adjust the location of the rotating throttle according to environmental affects which cause the motorcycle to change speed, like hills and wind, which may be determined by one or more sensors 126 or GPS 129.

Electronic cruise system 120 will disengage or shut off whereby the throttle springs back without any interference form the electronic cruise system 120. This may occur if any of these parameters are met: motorcycle 100 is turned off or has lost power. Electronic cruise system 120 may be turned off by the operator whereby an actuator is pressed or depressed. Electronic cruise system 120 may also shut off when brakes (front or rear) are engaged or the clutch is engaged whereby a RPM sensor spike, operator selects their redline or an RPM, an adjustable RPM setting by the operator, a clutch lever sensor, or the accelerometer determines that motorcycle 100 has tipped over or collided with another object causing an accident, or any other sensor. In further embodiments, electronic cruise system 120 is integrated with one or more brakes on motorcycle 100 such that the electronic cruise system 120 can actuate the brakes to apply varying degrees of brakeage when a signal is transmitted between electronic cruise system 120 and the brakes.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

What is claimed is:

1. An electronic cruise system connected or integrated to a vehicle with a rotatable throttle, the electronic cruise system having one or more sensors, the electronic cruise system having one or more computing systems to perform steps of:

rotating the throttle to accelerate, decelerate, or maintain speed of the vehicle, wherein the one or more computing systems further perform the steps of: holding the throttle in place with a throttle lock mechanism when an operator provides no rotation to the throttle while still being adjustable by the operator;

receiving a signal from a sensor of the one or more sensors to calibrate and set a speed of the electronic cruise system in order to manage a speed of the vehicle which can further be calibrated and set;

receiving input from the operator rotating the throttle from a reference point of a first speed to a reference point of a second speed wherein the input is receivable by the rotating of the throttle to accelerate or decelerate;

determining if a speed threshold is maintained at the reference point of the second speed for a predetermined amount of time;

calibrating the vehicle's speed in response to the determination; and holding the throttle in place at the reference point of the second speed with the throttle lock mechanism.

2. The electronic cruise system of claim 1 wherein the one or more computing systems further perform the steps of: determining if the one or more sensors are interrupted; and operating in throttle lock mode by holding a throttle position in response to the determination.

3. The electronic cruise system of claim 1, wherein the one or more computing systems further perform the steps of: communicating with a remote communicator.

4. The electronic cruise system of claim 1, further comprising a GPS tracking unit wherein the one or more computing systems further perform the steps of:

determining the speed from the GPS tracking unit;

determining an interruption of data from the GPS tracking unit; and switching over to a wheel sensor mode, in response to the determination of the interruptions wherein the RPM are measured to determine and maintain RPM as a speed alternative.

5. The electronic cruise system of claim 4, wherein the one or more computing systems further perform the steps of:

notifying by a first status indicator of no interruptions from the one or more sensors; and notifying by a second status indicator of an interruption from the one or more sensors.

6. The electronic cruise system of claim 1 wherein the one or more computing systems further perform the steps of:

determining if the speed is held at the reference point of the second speed for a stable hold of a period of at least three seconds.

7. The electronic cruise system of claim 1 wherein the one or more computing systems further perform the steps of:

modifying the predetermined amount of time in response to an adjusted time inputted by the operator through an actuable interface.

8. The electronic cruise system of claim 1 wherein the one or more computing systems further perform the steps of:

actuating one or more brakes to apply varying degrees of brakeage.

9. The electronic cruise system of claim 1 wherein the one or more computing systems further perform the steps of:

disengaging one or more systems of the electronic cruise system in response to a front brake, a rear brake, a sensor signal or clutch being engaged, wherein the throttle is configured to rotate freely without any interference from the electronic cruise system.

10. The electronic cruise system of claim 1, further comprising one or more actuators to turn on the electronic cruise system that is separate from an actuator to turn on a connected motorcycle or the throttle.

11. The electronic cruise system of claim 1 wherein the one or more computing systems further perform the steps of:

automatically activating the electronic cruise system at a predetermined speed or position.

12. An electronic cruise system connected to a rotating throttle on a vehicle, the electronic cruise system having a throttle lock mechanism which holds the rotating throttle in place when an operator provides no rotation to the throttle while still being adjustable by the operator, wherein the electronic cruise system calibrates a speed of the vehicle in response to a received gesture by the operator upon the rotating throttle for a period of one second or greater.

13. The electronic cruise system of claim 12, further comprising one or more sensors including one or more accelerometers and one or more impact sensors to determine proper positioning of user and the vehicle.

14. The electronic cruise system of claim 12, further comprising one or more sensors and a GPS tracking unit to determine the speed of the vehicle wherein the electronic cruise system analyzes one or more generated virtual maps with geography and topography of a real world location, wherein a position of the rotating throttle is adjusted in response to changes in the topography.

15. The electronic cruise system of claim 14 wherein the position of the rotating throttle is adjusted in response to changes in weather conditions.

16. The electronic cruise system of claim 14, wherein the electronic cruise system sends a signal during deceleration to a braking system.

* * * * *